United States Patent

[11] 3,600,023

| [72] | Inventor | Robert L. Gudde |
| | | Santee, Calif. |
| [21] | Appl. No. | 9,543 |
| [22] | Filed | Feb. 9, 1970 |
| [45] | Patented | Aug. 17, 1971 |
| [73] | Assignee | Rohr Corporation |
| | | Chula Vista, Calif. |

[54] LOCKING SYSTEM
8 Claims, 4 Drawing Figs.

[52] U.S. Cl. .................................................... 292/201
[51] Int. Cl. .................................................... E05c 3/22
[50] Field of Search ........................................ 292/201,
DIG. 49, 336, 223, 196, 210; 70/432

[56] References Cited
UNITED STATES PATENTS

| 3,113,352 | 12/1963 | Gibbs et al. | 292/201 X |
| 3,296,742 | 1/1967 | Mortimer | 292/201 X |

FOREIGN PATENTS

| 666,900 | 7/1963 | Canada | 292/336 |
| 1,191,769 | 4/1959 | France | 292/223 |

*Primary Examiner*—Richard E. Moore
*Attorney*—George E. Pearson

ABSTRACT: A rotatable drive crank is connected to an actuator and to a link which in turn is connected to a rotatable latch, the latter holding a movable member in a stowed position when the actuator moves the drive crank to a first position and permitting said movable member to move away from said stowed position when said actuator moves the drive crank to a second position. A rotatable retaining lever is coaxial with the latch and one end thereof is biased into engagement with rollers mounted on the drive crank and locks the latter in said second position thereof until the other end of the lever is contacted by the movable member as it returns to its stowed position.

INVENTOR.
ROBERT L. GUDDE
BY Edwin D. Grant
ATTORNEY

INVENTOR.
ROBERT L. GUDDE
BY Edwin D. Grant
ATTORNEY

INVENTOR.
ROBERT L. GUDDE
BY Edwin D. Grant
ATTORNEY

LOCKING SYSTEM

BACKGROUND OF THE INVENTION

This invention relates to a system for retaining a movable member in a predetermined position and for releasing said member from said position by actuation of the system from a remote point at any selected time. More particularly, the invention relates to such a system which can advantageously be employed to releaseably lock thrust-reversing blocker doors in a retracted position on an aircraft jet engine nacelle.

Jet-propelled aircraft are generally provided with thrust-reversing apparatus comprising a plurality of so-called blocker doors which can be positioned to deflect thrust gas of jet engines in a forward direction relative to the nacelles of said engines, thereby decelerating such aircraft at a selected time. It is important to provide positive means for locking the aforesaid blocker doors in their inoperative, or retracted, position and for releasing them so that they can be deployed. It is also important for pilots of aircraft equipped with blocker doors to know that the doors have been fully retracted and locked in fixed position after the mechanisms which stow the same have been operated.

SUMMARY OF THE INVENTION

The invention disclosed herein provides effective means for locking aircraft blocker doors in a retracted position and for releasing them for deployment at any selected time. Furthermore, the arrangement of a preferred embodiment of the invention ensures that a signal indicating a retracted position of a blocker door will not be transmitted to a pilot unless the blocker door has in fact been returned to such position and locked therein. These advantages are achieved by means of a locking system wherein a catch is mounted adjacent an edge of a blocker door which swings outwardly from an engine nacelle when deceleration of the associated aircraft is required. A first pivot pin is mounted on the nacelle in parallel relation with an edge thereof, and carries a latch which in a first position extends over the catch and thus prevents the blocker door from swinging away from a position in alignment with the last-mentioned edge, and which in a second position is moved out of the path taken by the catch as the door is deployed. A second pivot pin is fixed in position on the nacelle support structure in parallel relation with the latch-carrying pin and is disposed at a greater distance from the aforementioned edge of the nacelle than the latter. Pivotally mounted on the second pivot pin for rotation about the longitudinal axis thereof is a drive crank one portion of which extends toward the first pivot pin, one end of a link being pivotally connected to this portion of said drive crank and the other end of said link being pivotally connected to the latch. The drive shaft of a pressure-operated actuator is also pivoted to the drive crank at a point which is spaced from both the second pivot pin and the point of connection of the link to said drive crank, and the cylinder of the actuator is pivoted to the nacelle support structure for rotation about an axis parallel with the longitudinal axes of the first and second pins. The drive crank, link, and latch are arranged to that when the drive shaft of the actuator is moved toward the first pin, the end of the drive crank which is connected to the link swings inwardly toward the longitudinal axis of the nacelle and the link thereby swings the latch away from said axis to a point which spaced from the path traveled by the catch on the blocker door as the latter is deployed by an actuating mechanism associated therewith. The locking mechanism also includes a retaining lever which is pivoted to the first pin at the middle portion thereof and which is bifurcated on one side of said first pin, the side edges of this bifurcated section of said retaining lever respectively resting upon a pair of rollers mounted on the drive crank, when the latter is positioned so that the link connected thereto holds the latch in its locking position. A pair of torsion springs are also mounted on the first pin and interconnected to the latch and retaining lever so as to bias the latter toward the aforesaid rollers. When the actuator is operated to rotate the drive crank inwardly toward the longitudinal axis of the nacelle, which as previously mentioned swings the latch to a position which permits the blocker door to open, the arms of the bifurcated portion of the retaining lever follow the movement of the rollers and the points of contact therebetween shifts from the side edges of said arms to their end surfaces, thereby preventing movement of the drive crank in the reverse direction until the blocker door is returned to its stowed position and at this time strikes the other end of the retaining lever and rotates said lever to a position which permits the actuator of the drive crank to return the latter to its initial position.

DETAILED DESCRIPTION

Figure 1:
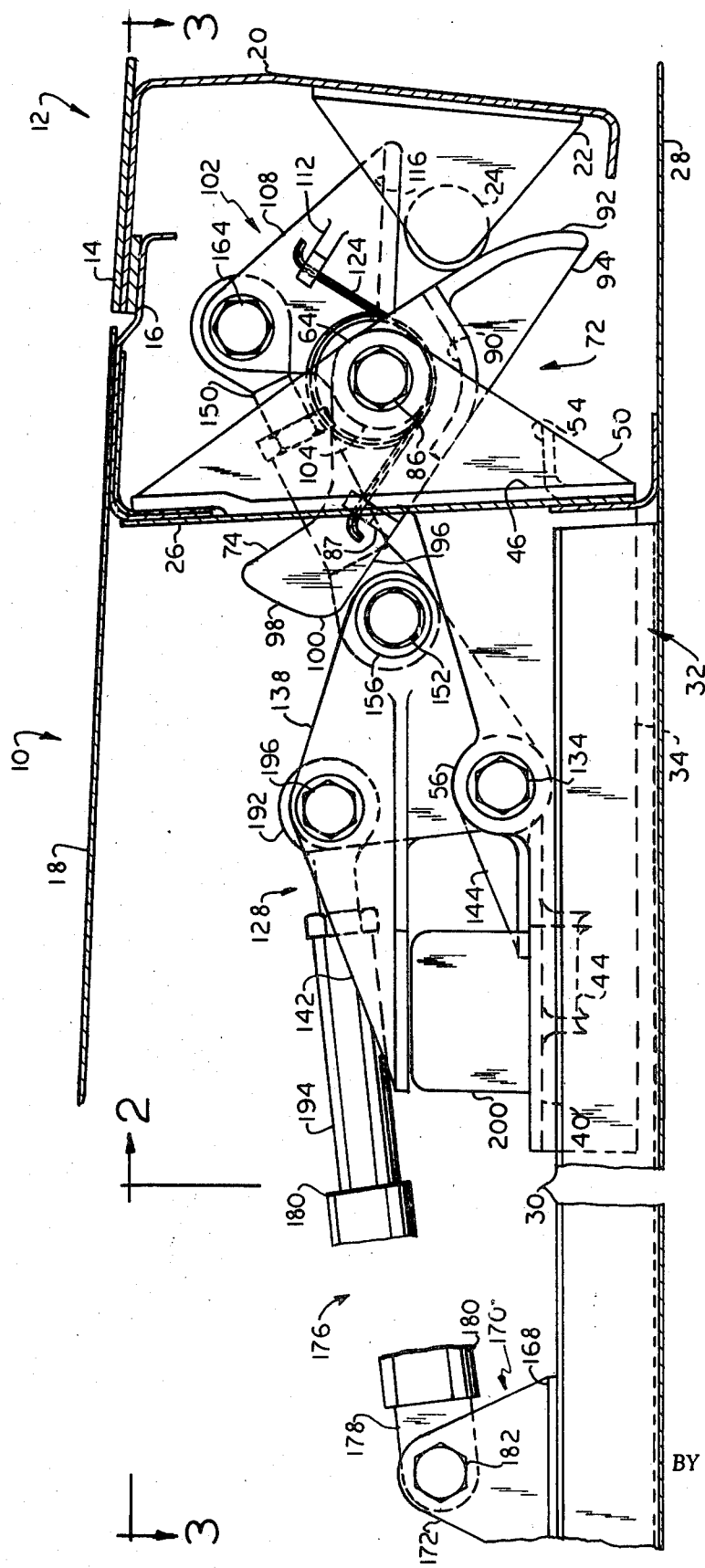
FIG. 1 is a side elevation of a locking mechanism constituting a preferred embodiment of the invention, the drawing also illustrating portions of the wall structure of an aircraft jet engine nacelle on which said mechanism is mounted and a portion of a thrust-reversing blocker door pivoted to said nacelle.

In FIG. 1 reference numbers 10 and 12 respectively designate generally a tubular aircraft jet engine housing (which may be an engine nacelle or a fuselage containing an engine) and a blocker door mounted thereon. More particularly, the middle portion of the blocker door (which is located beyond the right-hand portion of the drawing) is pivoted to the wall of the nacelle, and the door is movable by a suitable actuator, such as a hydraulic ram, between a retracted position wherein its forward edge 14 abuts a recessed lip 16 disposed at the forward side of an opening in housing 10 and a deployed position wherein said forward edge is swung outwardly from the outer wall 18 of said housing (see FIG. 4 which illustrates a partially deployed position of the blocker door). A forward wall 20 of the blocker door projects inwardly toward the longitudinal axis of housing 10 and has a mounting bracket 22 fixedly attached to the forward side thereof. Mounted on this bracket is a cylindrical catch 24 the longitudinal axis of which is disposed in substantially parallel relation with the adjacent portion of the forward edge 14 of the blocker door.

Figure 2:
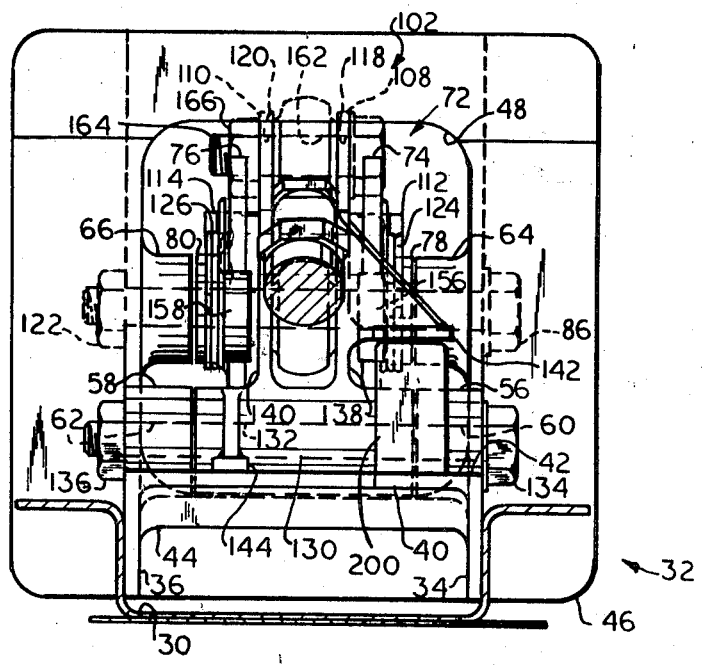
FIG. 2 is an end elevation of the same mechanism, taken along the plane represented by line 2–2 in FIG. 1 and in the direction indicated by arrows associated with said line.

A wall 26 is fixed in position between the outer wall 18 of housing 10 and the tailpipe 28 of the jet engine disposed therein, and a channel 30 (see FIG. 2 also) is fixedly secured to said tailpipe in perpendicular relation with said wall 26. Reference number 32 designates generally a frame comprising a pair of spaced, parallel sidewalls 34, 36 (see FIG. 3 also) which are fixedly connected to the sides of channel 30 by suitable means and the aft ends (i.e., the ends located on the right in FIG. 1) of which extend through an opening in wall 26. A crossmember, designated generally by reference number 38, extends between and is integrally joined to the forward ends of sidewalls 34 and 36, this member including a sensor support portion 40 which extends lengthwise of sidewall 34, an integral portion 42 which extends from said portion 40 to sidewall 36, and a rib 44 which is integrally joined to both said portion 40 and said portion 42 and extends perpendicularly therefrom. Frame 32 also comprises a plate 46 which is integrally joined to the aft ends of sidewalls 34 and 36 and which has an aperture 48 formed in the central portion thereof, a pair of parallel brackets 50, 52 which are integrally joined to the rear side of said plate on opposite sides of said aperture, and a flange 54 which extends between and is integrally joined to the adjacent sides of said brackets 50 and 52 and one edge of which is integrally joined to the adjacent portion of said plate. A pair of apertured bosses 56, 58 respectively project from the adjacent sides of sidewalls 34 and 36, the apertures 60, 62 of said bosses being coaxial. In like manner a pair of apertured bosses 64, 66 project from the adjacent sides of brackets 50 and 52, and the apertures 68, 70 thereof are coaxial.

Rotatably mounted between the bosses 64 and 66 of brackets 50 and 52 is a retaining lever generally designated by reference number 72. This component of the locking mechanism comprises a bifurcated portion the lever arms 74, 76 of which are disposed in parallel relation and respectively provided at their outer sides with laterally projecting bosses 78, 80. Coaxial apertures 82, 84 respectively extend through the lever arms 74, 76 of retaining lever 72, and the shank of a bolt 86 (hereinafter referred to as the first pivot pin) extends through aperture 70 in bracket 52, through said apertures 82 and 84, and through aperture 68 in bracket 50 (the first pivot pin also extends through an aperture in another component which will presently be described). For a reason which will become apparent hereinafter, a hook-shaped projection 87, 88 is integrally formed on the outer side of each lever arm 74, 76 and projects laterally therefrom. Retaining lever 72 also comprises a curved wall 90 which extends between lever arms 74, 76 and is integrally joined thereto, a curved member 92 which is integrally joined to said wall 90 and projects rearwardly therefrom, and a rib 94 which is integrally joined to both said wall 90 and said member 92. It should be noted that each lever arm 74, 76 of the bifurcated portion of retaining lever 72 is formed with a linear side edge 96 (see FIG. 1), an end edge 98, and a curved edge 100 disposed between said side edge and end edge.

Reference number 102 designates generally a latch which comprises a hub 104 having an aperture 106 extending therethrough, a pair of arms 108, 110 which project from said hub in spaced, parallel relation with each other, a pair of hook-shaped projections 112, 114 respectively formed on the outer sides of said arms, and a wall 116 joined to said hub and said arms and extending between the latter. Coaxial apertures 118, 120 (see FIG. 2) respectively extend through the portions of arms 108 and 110 which are adjacent lip 16 in FIG. 1. The hub 104 of latch 102 is positioned between the lever arms 74, 76 of the bifurcated portion of retaining lever 72, and first pivot pin 86 passes through the aperture 106 in said hub. Thus both retaining lever 72 and latch 102 are rotatable about the longitudinal axis of the first pivot pin, which axis is referred to in the appended claims as the first axis. To retain the first pivot pin in the apertures in brackets 50 and 52, a nut 122 is engaged with the threaded end thereof. The coils of a pair of torsion springs 124, 126 are respectively disposed around the bosses 78, 80 on the lever arms 74, 76 of retaining lever 72, the ends of spring 124 respectively being engaged with projection 87 on said retaining lever and on projection 112 of latch 102 and the ends of spring 126 respectively being engaged with projection 88 on said retaining lever and on projection 114 on said latch. Thus retaining lever 72 is resiliently biased to rotate counterclockwise (as it is viewed in FIGS. 1 and 4).

Reference number 128 designates generally a drive crank comprising a hub 120 which is disposed between the bosses 56, 58 on the sidewalls 34, 36 of frame 32 and which is formed with an aperture 132 extending between the ends thereof. The shank of a bolt 134 (hereinafter referred to as the second pivot pin) extends through the aperture in hub 130 and through the apertures 60, 62 in bosses 56 and 58, and a nut 136 is engaged with the threaded end thereof. The longitudinal axis of the second pin (which is referred to in the appended claims as the second axis) is parallel with the longitudinal axis of first pivot pin 86. Drive crank 128 also comprises a pair of generally triangular arms 138, 140 which project laterally therefrom, an indicator arm 142 which is integrally joined to arm 138 and projects forwardly therefrom, and an arm 144 which is integrally joined to hub 130 and projects forwardly therefrom. Coaxial holes 146, 148 are respectively formed in the apices of arms 138 and 140 which are closest to wall 26, and one end of an adjustable link 150 is disposed between said arms and pivoted thereto by means of a bolt 152 the shank of which passes through said holes 146, 148 and through an aperture 154 in said link end. A pair of rollers 156, 158 are also mounted on the shank of bolt 152 and respectively abut shoulders formed on the outer sides of arms 138 and 140. Bolt 152 is secured in position by means of a nut 160 engaged with its threaded end. The other end of link 150 is positioned between arms 108 and 110 of latch 102 and contains an aperture 162 (see FIG. 2). The shank of a bolt 164 extends through this aperture in the link and through apertures 118 and 120 in the latch arms, and a nut 166 is engaged with the threaded end of said shank. The longitudinal axes of bolts 164 and 152 (which are respectively referred to in the appended claims as the third and fourth axes) are disposed parallel with the longitudinal axes of bolts 86 and 134.

Figure 3:
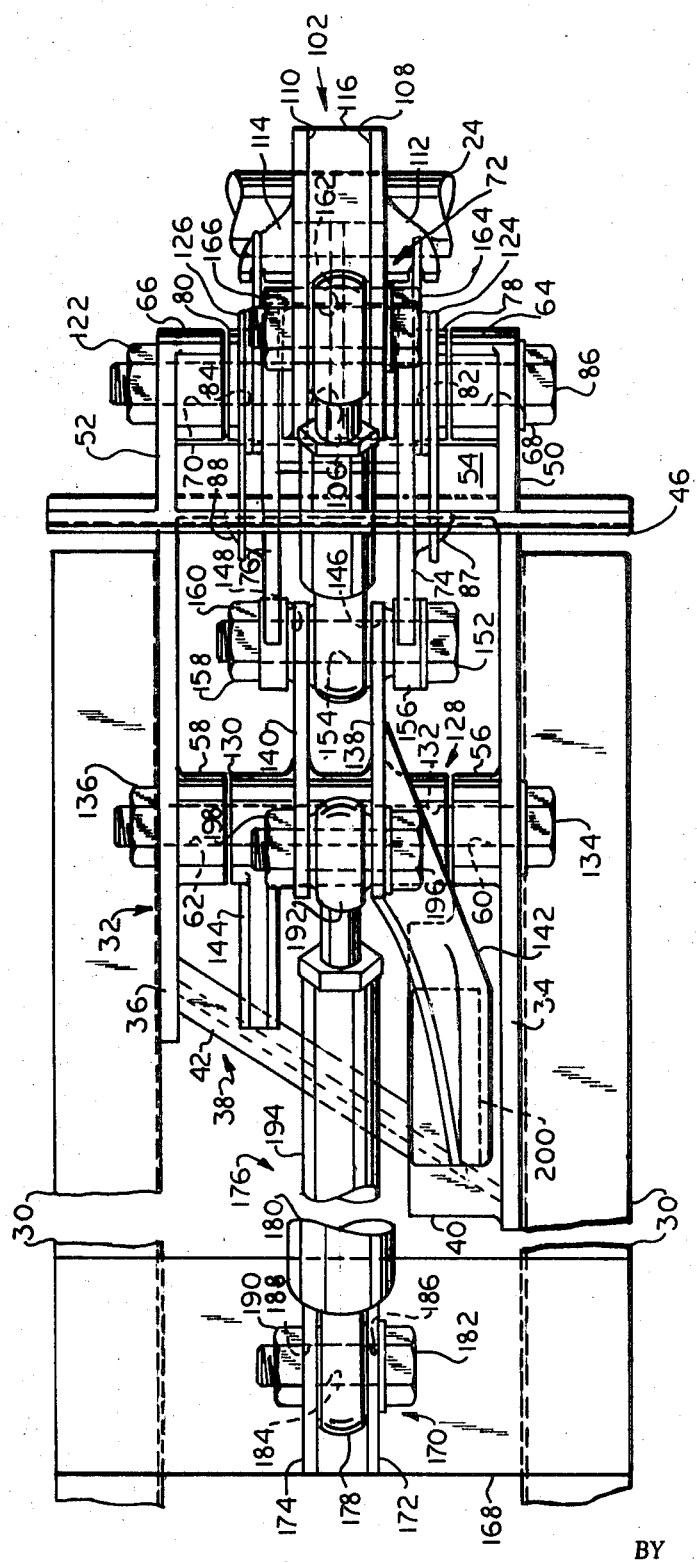
FIG. 3 is a plan view of the mechanism, taken along the plane represented by line 3–3 in FIG. 1 and in the direction indicated by arrows associated with said line.

A support plate 168 extends across channel 30 forward of frame 32 and has fastened thereto a bracket 170 having two parallel arms 172, 174 (see FIG. 3). Generally designated by reference number 176 is a hydraulic ram which has an apertured lug 178 integrally formed on one end of the cylinder 180 thereof. The shank of a bolt 182 is engaged within the aperture 184 in lug 178 and within apertures 186, 188 respectively formed in the free ends of arms 172 and 174, the bolt being retained in position by means of a nut 190 and the longitudinal axis of said bolt being parallel with the longitudinal axes of the previously mentioned bolts. The outer end 192 of the extensible shaft 194 of the ram is disposed between arms 138 and 140 of drive crank 128, the shank of a bolt 196 is snugly fitted within an aperture in said end 192 and within apertures in said arms, and a nut 198 is engaged with the end of said shank. The longitudinal axis of bolt 196 is parallel with the longitudinal axis of bolt 182. Cylinder 180 is connected by means of conduits (not shown) to conventional pressurizing apparatus which can be operated at any selected time to move shaft 194 either toward or away from wall 26.

Fixedly mounted on portion 40 of member 38 is a magnetic-type proximity sensor 200, preferably on the type sold by Electro Development Corporation, Lynwood, Washington.

OPERATION

The described lock system retains blocker door 12 in the closed, or stowed, position by placing latch 102 over catch 24 as illustrated in FIG. 1. When the latch is in its locking configuration drive crank 128 is in a first angular position relative to frame 32, wherein arm 144 thereof abuts portion 42 of member 38 and arm 142 is disclosed close to sensor 200. The signal transmitted by the sensor then indicates that the latch is rotated to the rear and over catch 24. At the same time retaining lever 72 is also in a first angular position relative to said frame, wherein the side edges 96 of the lever arms 74, 76 of said retaining lever are respectively close to rollers 156 and 158 on drive crank 128 (catch 24 holding the retaining lever in the FIG. 1 position although springs 124 and 126 bias lever arms 74, 76 of the retaining lever toward said rollers). It should be noted at this point that link 150 is overcentered relative to the longitudinal axis of second pivot pin 134 when drive crank 128 is in its first angular position (i.e., the longitudinal axis of bolt 152 is spaced from the plane which includes the longitudinal axes of bolts 134 and 164, and is disposed on the side of said plane which is remote from catch 24). If force is exerted against door 12 which through catch 24 tends to rotate latch 102 counterclockwise as it is viewed in FIG. 1, the overcentered arrangement of link 150 would tend to rotate drive crank 128 counterclockwise also, which cannot occur since arm 144 abuts member 38. Thus door 12 cannot be opened until the drive crank is rotated by actuation of cylinder 180.

The unlock sequence is initiated by hydraulic pressure applied to cylinder 180 so as to move shaft 194 rearwardly and thereby rotate drive crank 128 clockwise (as viewed in FIGS.

Figure 4:
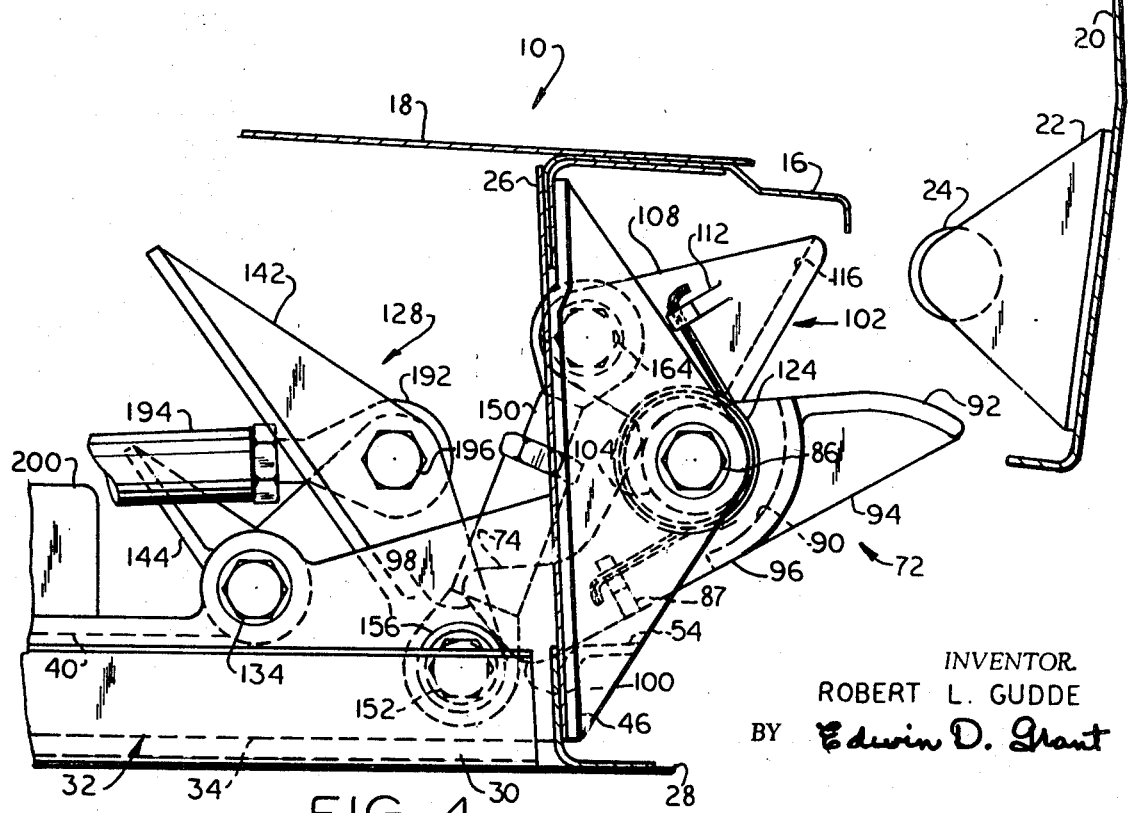
FIG. 4 is another side elevation of the mechanism, illustrating a different position of the movable components thereof.

1 and 2) to a second angular position relative to frame 32, wherein arm 142 is swung away from sensor 200 and link 150 causes latch 102 to rotate counterclockwise to the open position illustrated in FIG. 4. The signal transmitted by the sensor then indicates that the blocker door is unlocked, and the actuation system associated with said door can be operated to swing it to the deployed position. As the drive crank is rotated clockwise to the FIG. 4 position, springs 124 and 126 cause retaining lever 72 to turn counterclockwise, following the movement of rollers 156 and 158. However, the points of contact between said rollers and lever arms 74 and 76 of the retaining lever gradually shift so that when the lever arms contact flange 54 their end edges 98 are disposed adjacent the rollers. Thus the mechanism is arranged so that when drive crank 128 rotates to the second angular position thereof which is illustrated in FIG. 4, retaining lever 72 also rotates to a second angular position wherein its end edges 98 prevent rotation of said drive crank in the counterclockwise direction, which would close latch 102.

When door 12 is to be returned to the stowed position, its actuator is operated to effect such movement and simultaneously pressure is applied to cylinder 180 which tends to retract shaft 194 into the latter and thereby rotate drive crank 128 counterclockwise. This operation is prevented, however, until catch 24 strikes the rearwardly projecting member 92 of the retaining lever as the door moves to its stowed position, whereupon the retaining lever is rotated back to the position thereof that is illustrated in FIG. 1 and the subsequent translation of shaft 194 in the forward direction returns drive crank 128 and latch 102 to their FIG. 1 positions. Suitable limit switches of conventional design are provided to stop the pressurizing means associated with cylinder 180 when shaft 194 is either fully extended or fully retracted.

Various modifications can obviously be made in the mechanism which has been disclosed, without departing from the broad principles of its design and operation. Hence the scope of the invention should be considered to be limited only by the terms of the appended claims.

What I claim as new and useful and desired to be secured by U.S. Letters Patent is:

1. A system for locking a movable member in a fixed position and releasing it therefrom, comprising:
   a catch fixedly mounted on said movable member;
   a support structure fixed in position relative to said movable member;
   a latch mounted on said support structure for rotation about a first axis disposed transverse to the direction of movement of said movable member, said latch being rotatable between (1) a locking position wherein it cooperates with said catch to prevent movement of said movable member away from said fixed position and (2) a retracted position wherein it is swung out of the path traveled by said catch when said movable member moves away from said fixed position;
   a drive crank mounted on said support structure for rotation about a second axis disposed in spaced, parallel relation with said first axis;
   actuating means mounted on said support structure for rotating said drive crank between first and second angular positions relative thereto;
   a link one end of which is pivoted to said latch for rotation about a third axis disposed in spaced, parallel relation with said first axis and the other end of which is pivoted to said drive crank for rotation about a fourth axis disposed in spaced, parallel relation with said second axis, said link and drive crank being arranged so that when the latter is rotated in one direction relative to said support structure said latch is rotated in the opposite direction, said latch being in its locking position when said drive crank is in said first angular position and being in its retracted position when said drive crank is in said second angular position, said link being overcentered relative to said second axis when said drive crank is in said first angular position so that force exerted against said latch by said catch cannot move said drive crank to said second angular position;
   a retaining lever pivoted intermediate its ends to said support structure for rotation about said first axis and disposed transverse thereto, said retaining lever being in a first angular position relative to said support structure when said drive crank is in its first angular position, and the side edge of one of its lever arms then engaging a portion of said drive crank, said retaining lever being in a second angular position relative to said support structure when said drive crank is in its second angular position, and the edge of the aforesaid one of its lever arms then being disposed adjacent the aforesaid portion of said drive crank;
   means operatively associated with said system for limiting movement of said retaining lever after it is rotated from its first angular position to its second angular position; and
   spring means operatively associated with said system for resiliently biasing said retainer lever toward said second angular position thereof.

2. The system defined in claim 1 wherein said actuating means comprises a ram operated by fluid pressure.

3. The system defined in claim 1 wherein said drive crank has at least one roller mounted thereon for rotation about said fourth axis and the side edge of one of the lever arms of said retaining lever engaging said roller when said retaining lever is in its first angular position.

4. The system defined in claim 1 wherein said spring means comprises a torsion spring one end of which engages said latch and the other end of which engages said retaining lever.

5. The system defined in claim 1 including a stop fixed in position on said support structure and arranged to engage said drive crank when it rotates to said first angular position.

6. The system defined in claim 1 wherein said support structure is associated with an aircraft jet engine housing and said movable member is a blocker door mounted on said housing.

7. The system defined in claim 6 including sensing means carried by said housing and adapted to transmit to a point remote from said housing a signal representative of the position of said drive crank.

8. The system defined in claim 7 wherein said sensing means comprises:
   an indicator arm projecting from one side of said drive crank; and
   an electrical sensor fixedly positioned on said support structure so that said indicator arm is adjacent thereto when said drive crank is in said first angular position, said sensor being adapted to transmit to said remote point an electrical signal the intensity of which depends upon the position of said indicator arm relative thereto.